United States Patent [19]
Fukudome

[11] Patent Number: 5,889,930
[45] Date of Patent: *Mar. 30, 1999

[54] OUTPUT METHOD AND APPARATUS

[75] Inventor: Naobumi Fukudome, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 859,728

[22] Filed: May 21, 1997

Related U.S. Application Data

[63] Continuation of Ser. No. 258,739, Jun. 13, 1994, abandoned.

[30] Foreign Application Priority Data

Jun. 16, 1993 [JP] Japan .................................. 5-168409

[51] Int. Cl.$^6$ .................................................. H04Q 1/00
[52] U.S. Cl. ................ 395/109; 340/825.04; 340/825.22
[58] Field of Search .......................... 340/825.22, 825.04; 395/112, 110, 109

[56] References Cited

U.S. PATENT DOCUMENTS

| | | | |
|---|---|---|---|
| 4,426,166 | 1/1984 | Bowling | 395/101 |
| 4,580,242 | 4/1986 | Suzuki | 395/101 |
| 4,641,263 | 2/1987 | Perlman | 395/101 |
| 4,648,047 | 3/1987 | Berkland | 395/101 |

FOREIGN PATENT DOCUMENTS

| | | | |
|---|---|---|---|
| 0541398 | 5/1993 | European Pat. Off. . | |
| WO90/12359 | 10/1990 | WIPO | 395/112 |

*Primary Examiner*—Brian Zimmerman
*Attorney, Agent, or Firm*—Fitzpatrick, Cella, Harper & Scinto

[57] ABSTRACT

An output method and apparatus can receive data from any one of a plurality of host computers through respective interfaces or through a network. The output method and apparatus appropriately controls the receipt of data from a particular host computer in accordance with a time-out function and an interrupt function, and is able to control the processing of data at the end of the receipt of data.

10 Claims, 10 Drawing Sheets

OUTPUT METHOD AND APPARATUS

This application is a continuation of application Ser. No. 08/258,739 filed Jun. 13, 1994 now abandoned.

FIELD OF THE INVENTION

The present invention relates to an output method and apparatus which can appropriately switch its input from among a plurality of interfaces and/or host computers.

RELATED EQUIPMENT ART

Recently, printing devices have developed which have the function of distinguishing when a break occurs in a data stream from a host computer. In some cases after receiving a start command, such a device starts its processing and, if there is no reception of data for a predetermined period, finishes processing and outputs whatever data it has processed. On the other hand, in some cases such a device is unable to finish processing of data without receiving a stop command.

However, while an application program which can produce a stop command after data processing is executed on a host computer, if the host computer does not transmit data to a printing device for more than a predetermined time in accordance with a user's direction, data processing in the printing device is terminated, even if this is not desired.

Also if a host computer entrusts an end job to a printing device and does not transmit a stop command after transmitting a quantity of data processed in the host computer, there can be problems. Specifically, if the printing device needs more time than the computer's time-out period for analyzing the data in a receiving buffer in the printing device, the data processing of both of the computer and the printing device cannot be finished.

Furthermore, some printing devices have been developed which have plural interfaces each connected to a respective host computer. If the printing device changes from one interface to another interface after a data process in the printing device is finished, and if the device does not receive a stop command from a host computer, the device cannot receive data from another host computer through the other interface without finishing the first data process.

Some printing devices have also been developed which have a network interface by which plural host computers are connected with the printing devices. Here again the printing device cannot receive data from another host computer because if the printing device does not receive a stop command, the device cannot change from one host computer to another.

SUMMARY OF THE INVENTION

The present invention has been made in consideration of the above situation, and has as one of its objects to provide an output method and apparatus capable of being setting information indicating a prerequisite for ending a data process so that the control unit can change from the interface that is transmitting to another interface if necessary. Therefore, during data processing, the control unit does not always finish processing the data even if more time than a predetermined data process time elapses without receiving data. Accordingly, the output unit can execute output processes appropriately.

Another object of the present invention is to provide an output apparatus and method capable of determining whether it has received information which shows that additional data will come. As a result, a control unit can count a precise time available for a host computer and can appropriately finish outputting data.

Another object of the present invention is to provide an output apparatus and method capable of determining whether no data is received by the output device for a predetermined period. A control unit can count a precise time for the output apparatus, and if it is uncertain whether the output device can receive a stop command, the control unit can begin receiving data from another host computer in a networking operation. Therefore, if there is no data from one host computer in the network for a predetermined period, the control unit promptly can begin processing output data from another host computer in the network.

DETAILED DESCRIPTION OF THE PREFERRED EMBODIMENTS

Embodiments according to the present invention will now be described with reference to the accompanying drawings.

Figure 7:
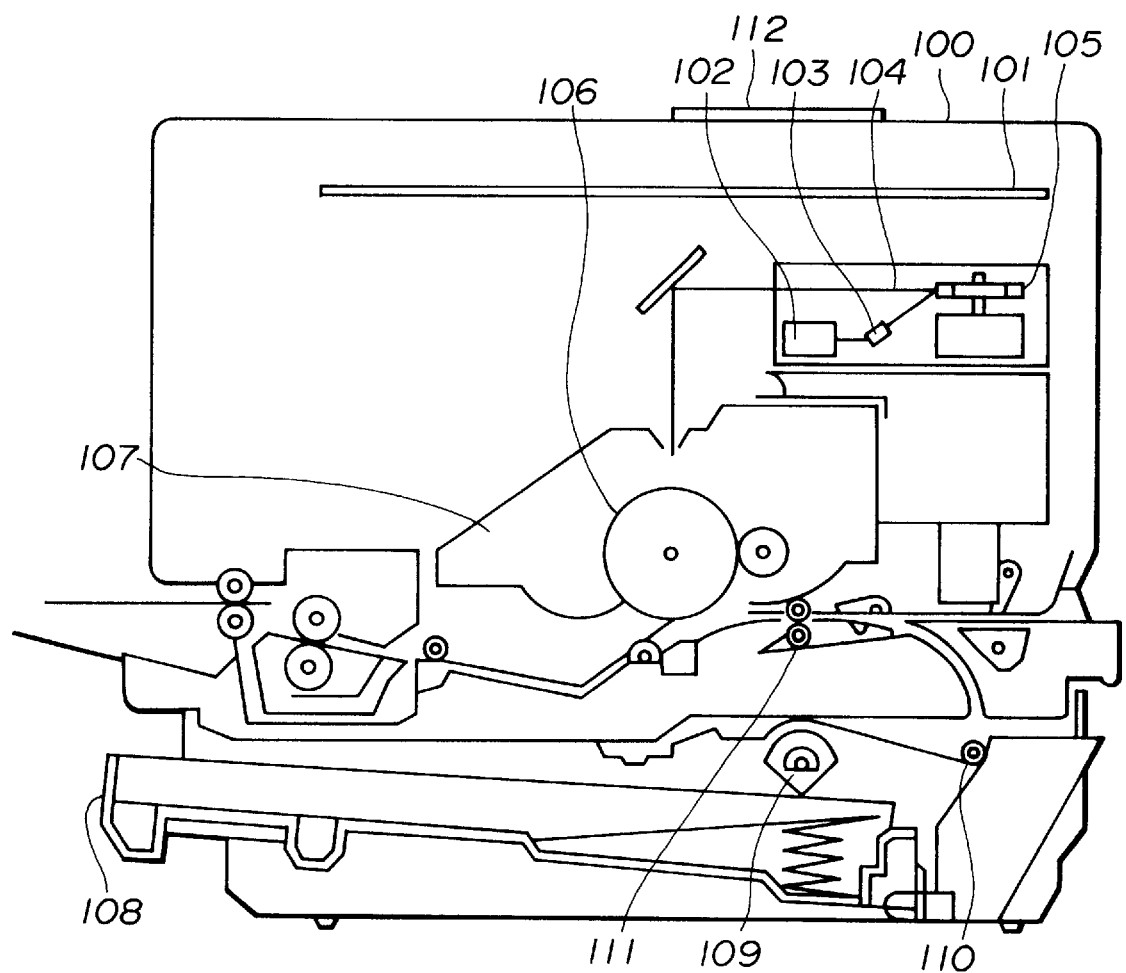
FIG. 7 is a cross-sectional view of a recording apparatus, such as a laser beam printer.

FIG. 7 is a cross-sectional view of a recording apparatus, such a laser beam printer, to which the output method of the present invention is applicable.

A main body 100 (printer) of the apparatus receives and stores print information (character codes etc.), from information and macro instructions supplied from an external host computer, generates and forms character patterns and forms an image on a recording sheet constituting the recording medium. There are also shown an operation panel 112 including switches and LED indicators for various operations and a printer control unit 101 for controlling the entire printer 100 and analyzing the character information supplied from the host computer. The printer control unit 101 converts the character information into a video signal of corresponding character patterns for supply to a laser driver 102, which drives a semiconductor laser 103 and switches the laser beam 104 emitted from the semiconductor laser 103 on and off according to the input video signal. The laser beam 104 is laterally deflected by a rotary polygon mirror 105 to scan an electrostatic drum 106, thereby forming an electrostatic latent image of a character pattern thereon. The latent image is developed into a visible image by a developing unit 107 positioned around the electrostatic drum 106, and is transferred onto the recording sheet. The recording sheet is a cut sheet contained in a cassette 108 mounted on the main body 100 and supplied therefrom by a feed roller 109 and transport rollers 110 and 111 to the electrostatic drum 106.

The image processing apparatus of each embodiment described below utilizes a laser beam printer. However, the present invention is not limited to this and may be equally applied to other printers such as an ink-jet printer to be described later.

Figure 9:
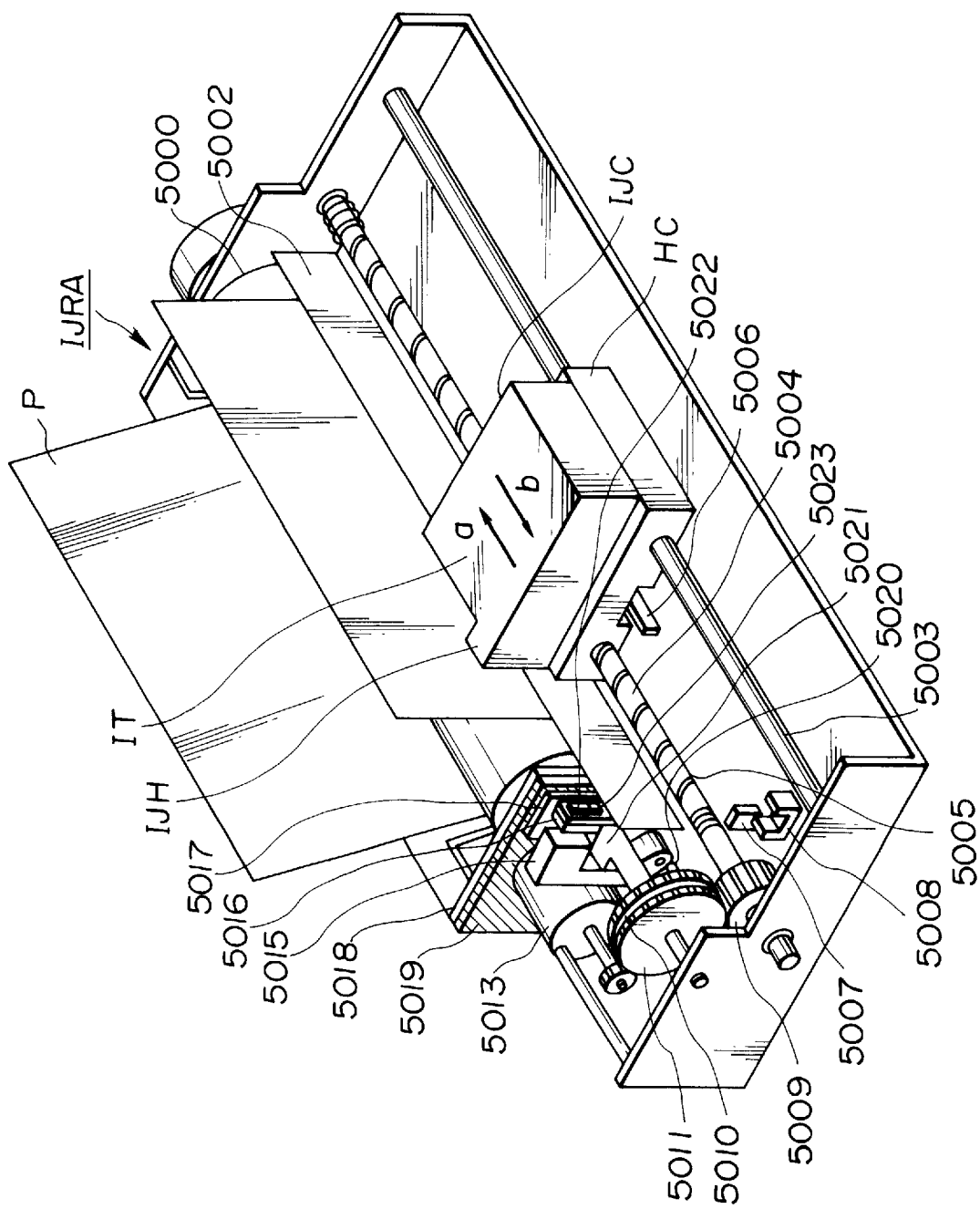
FIG. 9 is a perspective view showing the internal structure of an ink jet printer to which the present invention can be applied.

FIG. 9 is a perspective view of the main body of an ink-jet recording apparatus IJRA to which the present invention can be applied. Referring to FIG. 9, a carriage HC engages with a helical groove 5005 of a lead screw 5004 rotated interlockingly with the normal/reverse rotation of a drive motor 5013 through driving force transmission gears 5011 and 5009 having a pin (not shown), and can be reciprocated in directions indicated by arrows a and b. An ink-jet cartridge IJC is mounted on the carriage HC. A paper press plate 5002 presses the paper in the carriage movement direction through a platen 5000. Photosensors 5007 and 5008 are home position detecting means for detecting the presence of a lever 5006 of the carriage within this range to switch the rotational direction of the motor 5013. A member 5016 supports a cap 5022 for capping the front surface of a recording head. A suction device 5015 draws the ink from the cap to recover the recording head through an opening 5023 in the cap. A cleaning blade 5017 is moved back and forth by a member 5019, and the cleaning blade 5017 and the member 5019 are supported on a main body support plate 5018. The blade need not have this form, but can be replaced with a known cleaning blade. A lever 5021 starts suction to recover the recording head. The lever 5012 is moved together with movement of a cam 5020 engaged with the carriage. The driving force from the driving motor is controlled by a known transmitting means such as clutch switching.

Capping, cleaning and suction recovery are performed by desired processes at the corresponding positions in accordance with the behavior of the lead screw 5004 when the carriage reaches the home position. If desired operations are performed at known timings, any scheme therefor can be employed.

Figure 10:
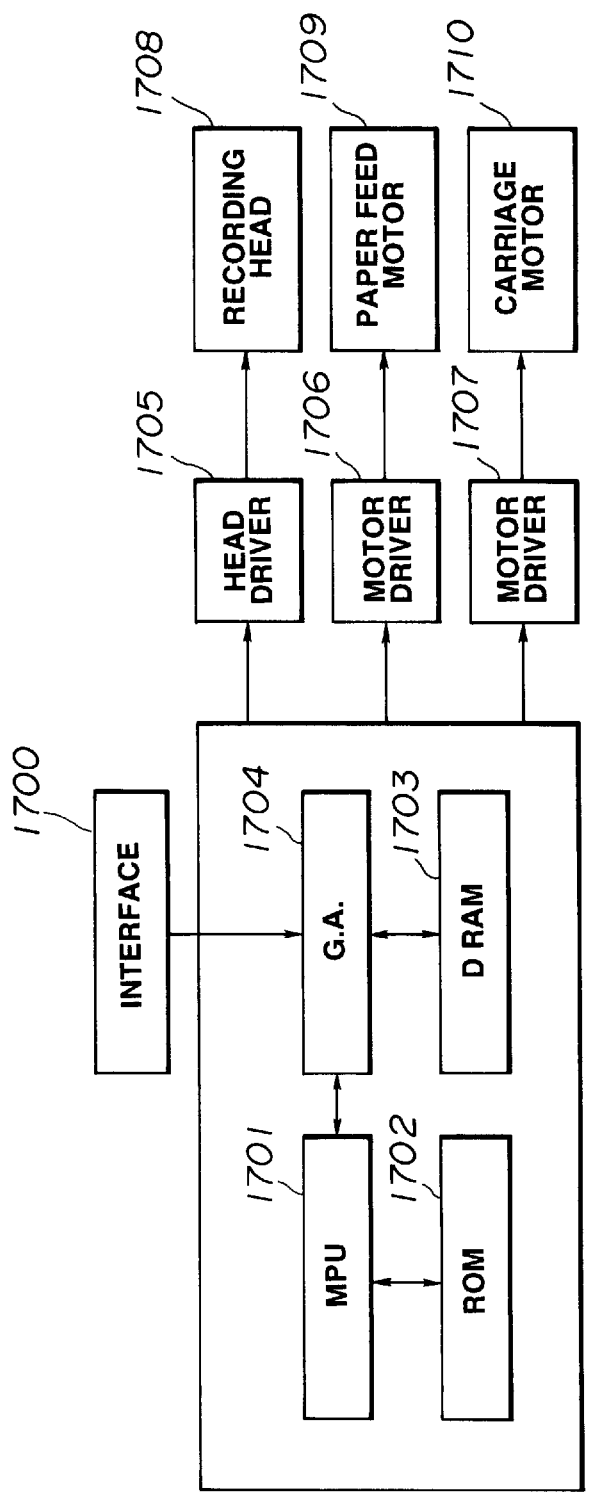
FIG. 10 is a block diagram of a control circuit of the ink-jet printer shown in FIG. 9.

A control arrangement for executing recording control of the respective components in the primary apparatus will now be described with reference to the block diagram in FIG. 10. A control circuit includes an interface 1700 for inputting a recording signal, an MPU (microprocessing unit) 1701, a program ROM 1702 for storing control programs executed by the MPU 1701, a dynamic RAM 1703 for storing various types of data (e.g. the recording signal and recording data supplied to the head), a gate array 1704 for controlling and supplying the recording data to a recording head 1708, a paperfeed motor 1709 for conveying a recording sheet, a head driver 1705 for driving the head, and motor drivers 1706 and 1707 for driving the paperfeed motor 1709 and,the carriage motor 1710, respectively.

The operation of the above control arrangement is as follows. When a recording signal is input to the interface 1700, it is converted into print recording data by the gate array 1704 and the MPU 1701. The motor drivers 1706 and 1707 are driven to drive the recording head in accordance with the recording data supplied to the head driver 1705, thereby printing the recording information.

It is also possible to incorporate the constituent components of the present invention in the control arrangement of an ink-jet printer, and the present invention is applicable to an ink-jet printer as well as a laser beam printer.

Figure 8:
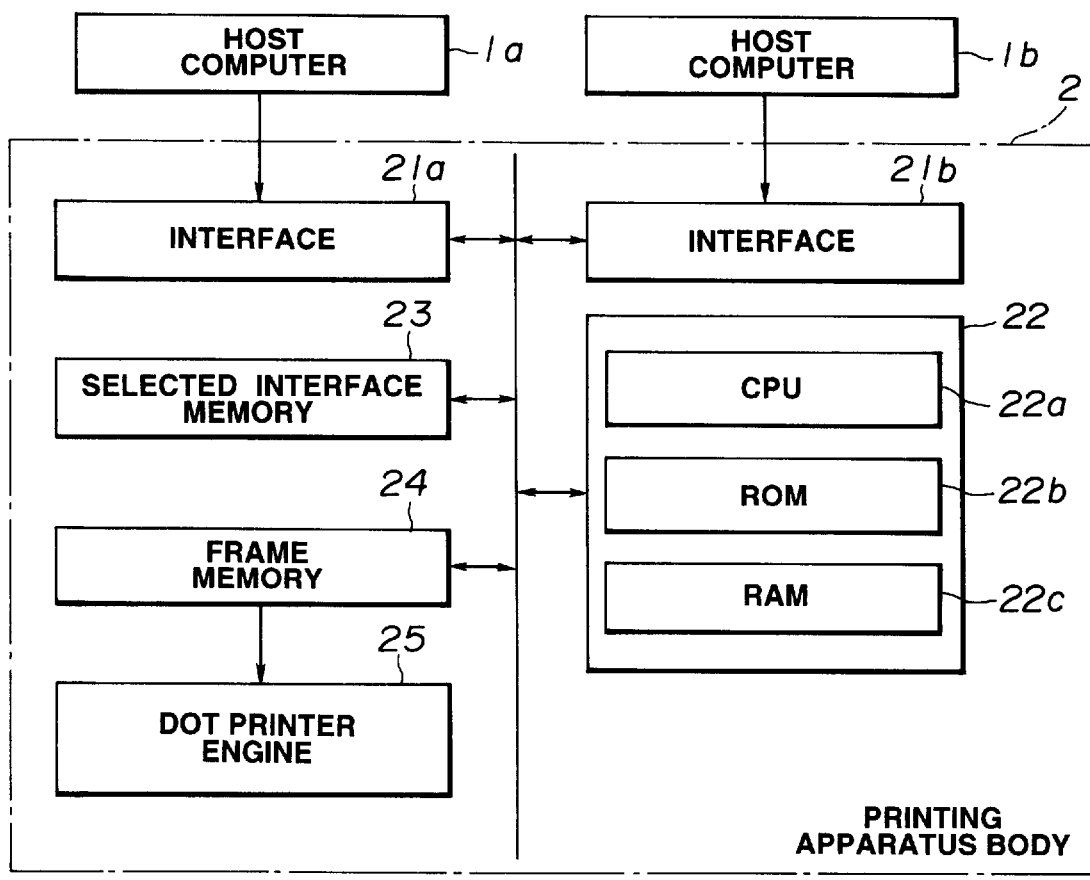
FIG. 8 is a block diagram showing the construction of a printing,apparatus common to all embodiments.

FIG. 8 is a block diagram showing the construction of a controller of the printing apparatus in accordance with the present invention.

1a, 1b are host computers and 2 is the body of the printing apparatus. Each of the host computers 1a and 1b sends data such as print data to the printing apparatus. Each of the interfaces 21a and 21b can receive data from the host computers 1a and 1b.

Controller 22 controls the entire printing apparatus. The controller consists of a CPU 22a, a ROM 22b which stores a program of process and outline font data and other data, and a RAM 22c which includes receiving buffers and a work area which enables the CPU 22a to execute the programs. This work area of the RAM 22c stores information which defines the size of each buffer.

Memory 23 stores information for whichever of the interfaces is currently selected.

Frame memory 24 is capable of storing bit map data for one page. The bit map data which is stored in the frame memory 24 is printed by dot printer engine 25.

In the above printing apparatus, the CPU 22a executes processes in accordance with programs which are stored in ROM 22b. One such process determines the size of each receiving buffer (a part of area of RAM 22c) corresponding to each interface. The CPU 22a also executes a further process, in accordance with a program which is stored in ROM 22b, to ensure the size of the receiving buffer which has been determined by the ROM 22b means.

The CPU 22a also executes a taking process in accordance with a program stored in ROM 22b to take data through each interface to be stored in the respective receiving buffer.

Figure 1:
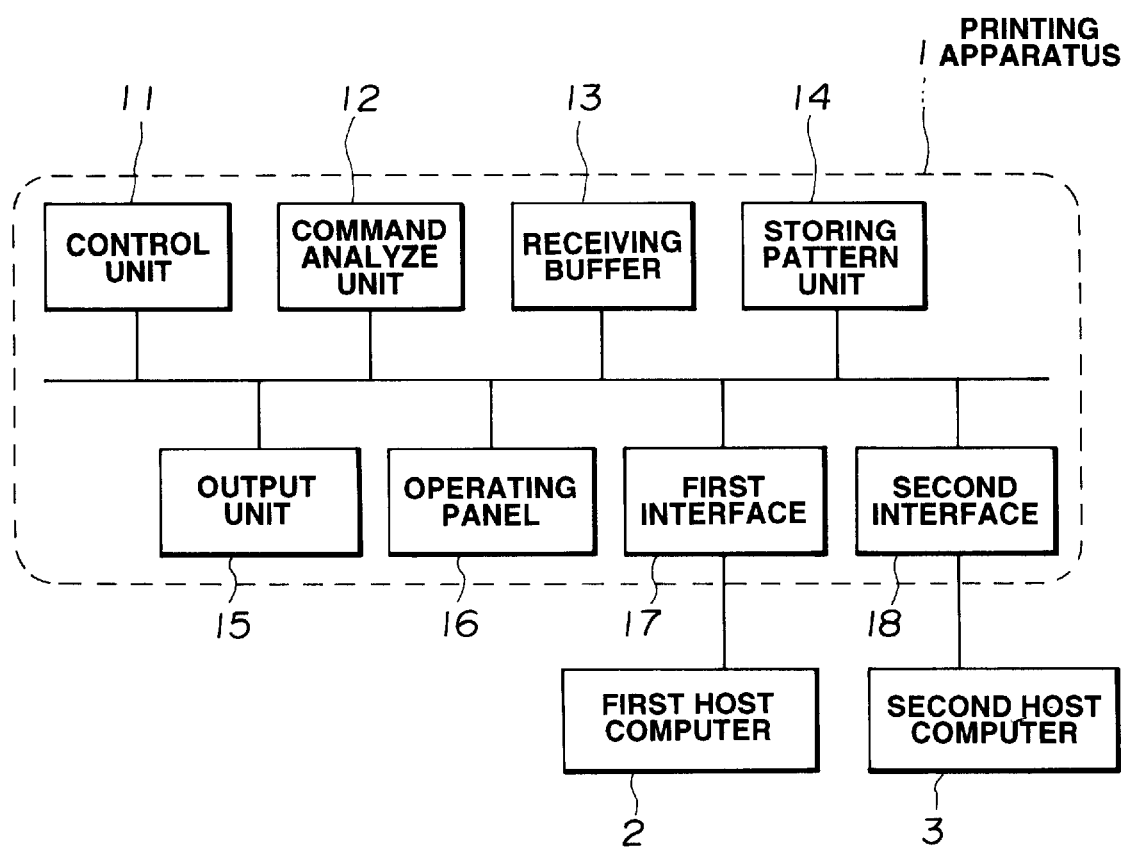
FIG. 1 is a block diagram showing control circuitry of a printing apparatus according to a first embodiment of the present invention.

FIG. 1 is a block diagram showing the construction of the control circuitry of a printing apparatus in accordance with a first embodiment of the present invention.

In FIG. 1, 1 is the body of the printing apparatus, 2 is a first host computer which can communicate data to the apparatus 1 through first interface 17 and 3 is a second host computer which can communicate data to the apparatus 1 through second interface 18. In this embodiment, the first interface 17 may be a Centronics interface which is produced by the Centronics Company and the second interface 18 may be a RS232C interface.

Figure 2:
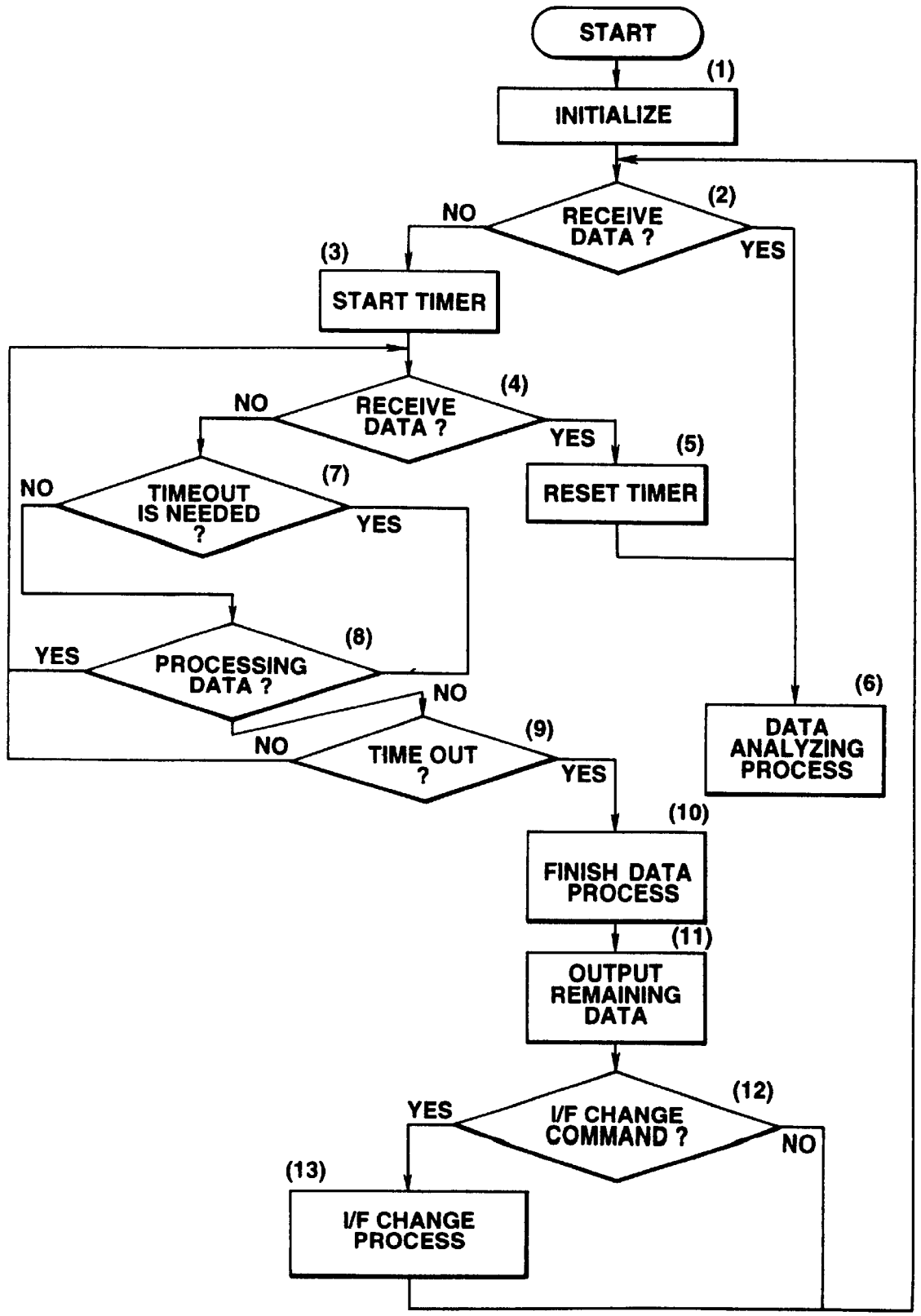
FIG. 2 is a flowchart showing an example of a print information processing procedure according to the first embodiment of the present invention.

In the printing apparatus 1, 11 is a control unit which controls the entire apparatus, and in particular the finishing step of data processing and the output processing of any remaining data if the printing apparatus receives no data for a predetermined period in accordance with a program illustrated in the flowchart of FIG. 2. 12 is a command analyze unit which analyzes commands held in a receiving buffer 13, asks the control unit 11 to process data and transfers printing data to a storing pattern unit 14. Receiving buffer 13 stores data received through the first interface 17 or the second interface 18 until the command analyze unit 12 analyzes the data. 14 is a pattern storing unit which converts the print data to bit map patterns and stores them. 15 is an output unit which outputs the bit map patterns from the pattern storing unit 14. 16 is an operating panel for changing a print environment. In this first printing apparatus, after a predetermined period in no which data is received through a selected interface, the control unit 11 sets a condition indicating an end of data processing in a memory (an inner memory of control unit 11) and a condition of processing the data actually received. Thereafter the control unit 11 sets the condition of processing data to be either a waiting condition or an interruption condition in accordance with the program illustrated by the flowchart in FIG. 2. When the interruption condition is set, the output unit 15 outputs any remaining data. After this, the control unit 11 determines whether an I/F change command has been received to change from the interface from which data was just received to another interface in accordance with the flowchart in FIG. 2. As a result, during data processing, the control unit 11 does not stop data processing even if more than a predetermined data processing time elapses without receiving data. Accordingly the output unit 15 can execute the output process appropriately.

FIG. 2 is a flowchart showing an example of a print information processing procedure according to the first embodiment. The details of the steps of data processing, converting data into bit map data and output processing are conventional and therefore are omitted.

In step (1), the control unit 11 sets an initial output environment by setting output environment information that shows that the first interface 17 is selected (a parallel interface such as that produced by the Centronics Company). The output environment information also establishes that it is unnecessary to produce a time-out signal while processing data. The output environment information is changeable by the operating panel 16. In step (2), the command analyze unit 12 analyzes data including commands in the receiving buffer 13. In particular, the command analyze unit 12 determines whether data is being received or not. If YES in step (2), the flow advances to step (6). In step (6) the command analyze unit 12 analyzes the received data. If the received data is a command which instructs the start of data processing in step (6), the control unit 11 begins processing data. If the received data is output data, the control unit 11 transfers it to the storing pattern unit 14, and then the flow returns to step (2). The storing pattern unit 14 simultaneously starts to convert the data to dot pattern data.

If NO in step (2), the control unit 11 begins to count the time during which no data is received in step (3) and checks in step (4) whether data is now being received.

If YES in step (4), the control unit 11 stops counting and the timer is reset in step (5), and the command analyze unit 12 analyzes the received data in step (6). After that the flow returns to step (2).

If data is not received in step (4), the flow advances to step (7). In step (7), the control unit 11 determines whether the output environment information shows whether it is necessary to produce the time-out signal while processing data. If YES in step (7), the flow advances to step (9), wherein the control unit 11 determines whether the time-out signal is produced or not. Initially the output environment information is set to make it unnecessary to produce the time-out signal. Therefore, the flow advances from step (7) to step (8).

In step (8), the control unit 11 determines whether data processing currently being is executed. If YES in step (8), the flow returns to step (4).

If NO in step (8), the flow advances to step (9) wherein the control unit 11 determines whether the time-out signal is produced or not. If NO in step (9), the flow returns to step (4). If YES in step (9), the flow advances to step (10), wherein the control unit 11 finishes executing the data processing. The flow then advances to step (11), wherein the control unit 11 outputs the remaining data if there is any the remaining data. The flow then advances to step (12), wherein the control unit 11 determines whether the printing apparatus 1 is to receive data from the second host computer 3 in step (12). More specifically the control unit 11 recognizes whether it has received an I/F change command.

If YES in step (12), the control unit 11 changes from the first interface 17 to the second interface 18 for processing data in step (13), and then the flow returns to step (2). If NO in step (12), the flow returns directly to step (2). In this embodiment, the output environment information can be changed by the operational panel 16, or a command from the other host computer can change the output environment information.

Figure 3:
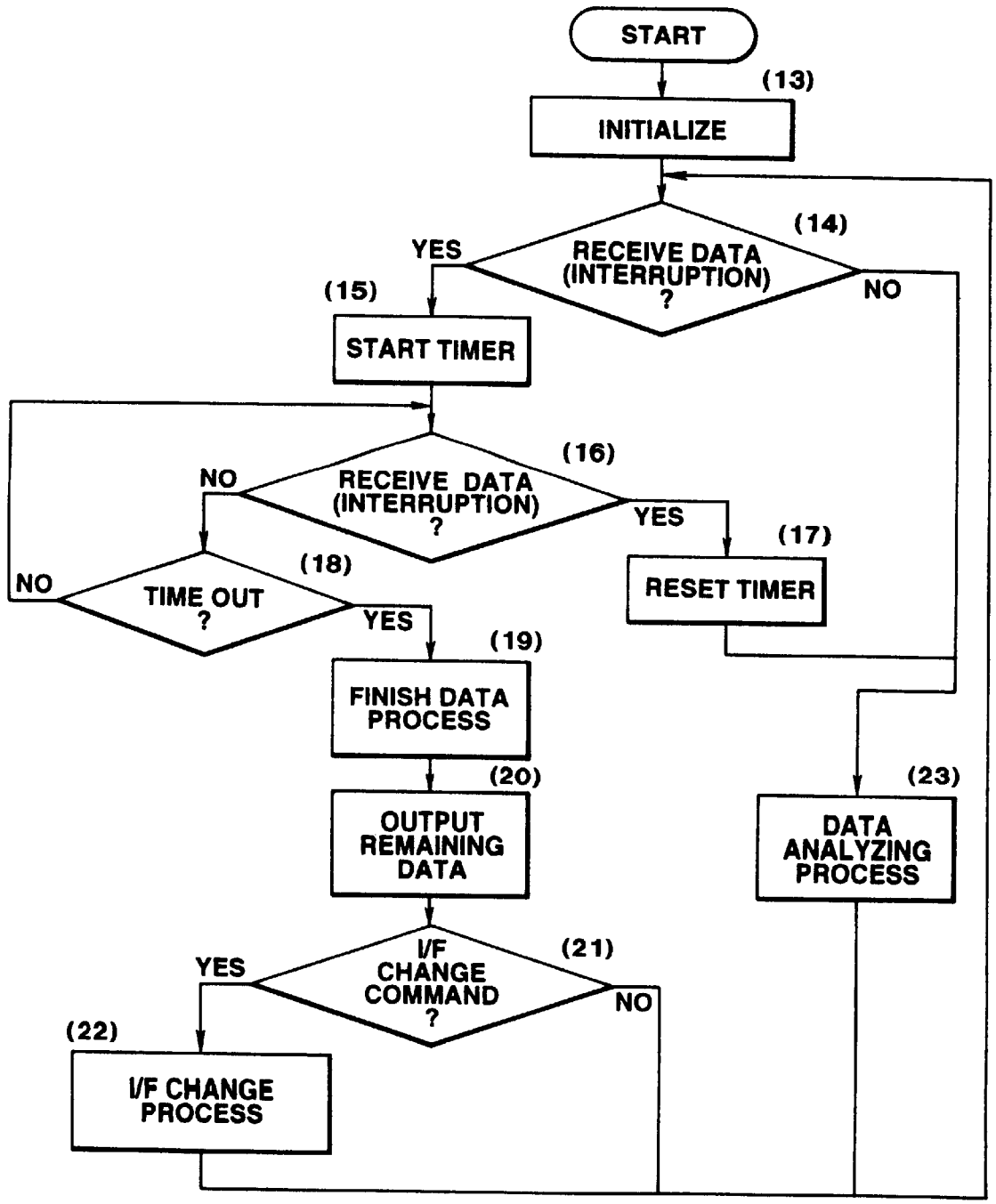
FIG. 3 is a flowchart showing an example of a print information processing procedure according to a second embodiment of the present invention.

FIG. 3 is a flowchart showing another example of a print information processing procedure according to a second embodiment of the invention. Again, the detailed description of the steps of data processing, converting data into bit map data and output processing are omitted. In this embodiment, the mode of informing the control unit 11 that data is being received from each interface is by a hardware interruption.

In step ((14), the control unit 11 sets up the initial output environment information to select the first interface 17.

In step (15), the control unit 11 determines whether it has received information, including commands, comprising data or an interruption of the reception of data.

If YES in step (15), the flow advances to step (16) and the control unit 11 begins to count the time during which no data is received. The flow then advances to step (17), wherein the control unit 11 determines whether an interruption of reception is received.

If YES in step (17), the control unit 11 stops counting and the flow advances (18) to reset the timer and then to step (23), wherein the command analyze unit 12 analyzes the data in the receiving buffer 13. If there is a start command for processing data in the receiving buffer 13, the control unit 11 begins processing data. On the other hand, if there is print data in the receiving buffer 13, the control unit 11 transmits it to the storing pattern unit 14, and the flow returns to step (15). If NO in step (17), the flow advances to step (19). In step (19), the control unit 11 determines whether the time-out signal has been received or not. If NO in step (19), the flow returns to step (15). If YES in step (19), the flow advances to step (20), in which the control unit 11 finishes processing data. The flow then advances to step (21), wherein the control unit 11 outputs the remaining data if there is any remaining data. The flow then advances to step (22), wherein the control unit 11 determines whether the printing apparatus 1 is to receive data from the second host computer 3. The control unit 11 recognizes this by recognizing an I/F change command. If YES in step (22), the control unit 11 changes from the first interface 17 to the second interface 18 for processing data in step (10).

If NO in step (22), the flow returns to step (15). In the printing apparatus of FIG. 1, during the counting time by the control unit 11, the control unit 11 determines whether an interruption has been received in accordance with the flow chart showed in FIG. 3. The control unit 11 accordingly controls either the continuation or the interruption of the process of outputting data. The control unit 11 can stop processing output data if no output data is received from the host computer for more than a predetermined period even though the control unit 11 needs a long time to process output data. In this embodiment, other interfaces such as a SCSI interface or a RS422 interface is also applicable. The mode of informing the receipt of data to the control unit 11 from each interface is by a hardware interruption, but the control unit 11 could also examine an I/O register to be informed of the receipt of data.

Figure 4:
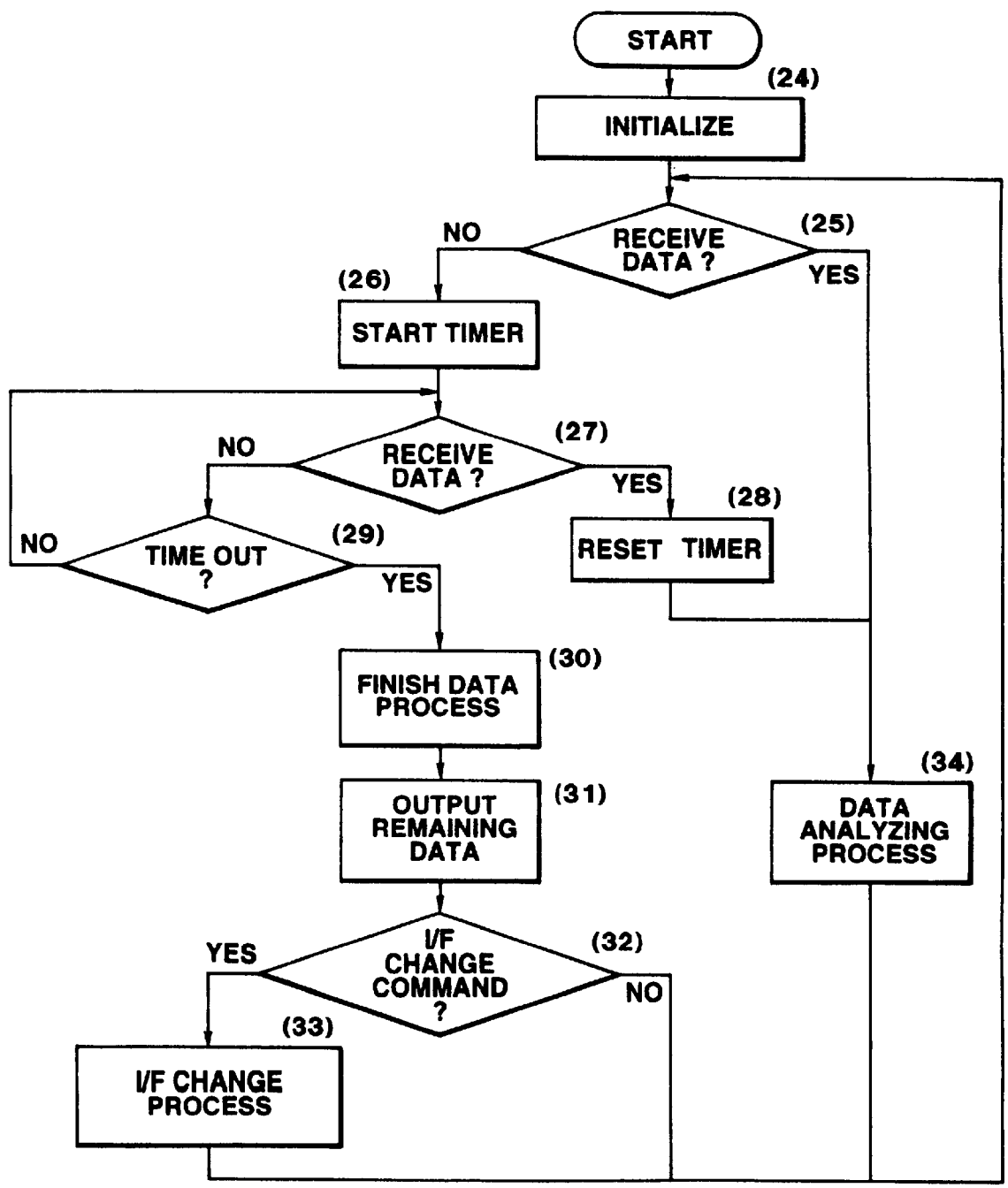
FIG. 4 is a flowchart showing an example of a print information processing procedure according to a third embodiment of the present invention.

FIG. 4 is a flowchart showing another example of a print information processing procedure according to a third embodiment. As in the previous embodiments, the detailed description of the steps of data processing, converting data into bit map data and output processing are omitted. The output environment information is set to select the first interface 17 (a parallel interface such as that produced by the Centronics Company). The second interface 18 is a RS232C interface.

In step (24), the control unit 11 sets up the initial output environment and the first interface 17 is selected.

In step (25), the command analyze unit 12, which can analyze data including commands in the receiving buffer 13, determines whether data is being received or not. If YES in step (25), the flow advances to step (34). In step (34), the command analyze unit 12 analyzes the data in the receiving buffer 13. If there is a start command for processing data in the receiving buffer 13, the control unit 11 begins processing data. If there is print data in the receiving buffer 13, the control unit 11 transmits it to the storing pattern unit 14 and the flow returns to step (25).

If NO in step (25), the flow advances to step (26). The control unit 11 begins to count the time during which no data is received. The flow advances to step (27) in which the control unit 11 determines whether data is now being received. If YES in step (27), the flow advances to step (28) in which the control unit 11 stops counting and the timer is reset, and then the flow advances to step (34). After that, the flow returns to step (25).

If NO in step (27), the flow advances to step (29) and the control unit 11 determines whether the time-out signal has been received or not. If NO in step (29) the flow returns to step (27).

If YES in step (29), the flow advances to step (30), wherein the control unit 11 finishes processing data. The flow then advances to step (31), wherein the control unit 11 executes output processing on remaining data if there is any data remaining. The flow then advances to step (32), wherein the control unit 11 determines whether the printing apparatus 1 is to receive data from the second host computer 3 by recognizing an I/F change command. If YES in step (32), the control unit 11 changes from the first interface 17 to the second interface 18 for processing data in step (33).

If NO in step (32), the control unit 11 recognizes the absence of an I/F change command and the flow returns to step (25).

In the apparatus of FIG. 1, during the counting time by the control unit 11, the control unit 11 determines whether there is output data in the receiving buffer 13 and controls the continuation or interruption of processing output data in accordance with the flowchart shown in FIG. 4. Accordingly, when the control unit 11 controls the interruption of processing output data, the output unit 15 outputs the remaining data. When the output unit 15 finishes outputting this data, the control unit 11 determines whether there is a command to change interfaces the interface just used for communication to another interface in accordance with the flowchart shown in FIG. 4. Therefore, even if it is uncertain whether the printing device can receive a stop command, the control unit can begin receiving data from a host computer which is connected to another interface.

In this embodiment, other interfaces such as a SCSI interface or a RS422 interface are applicable.

Figure 5:
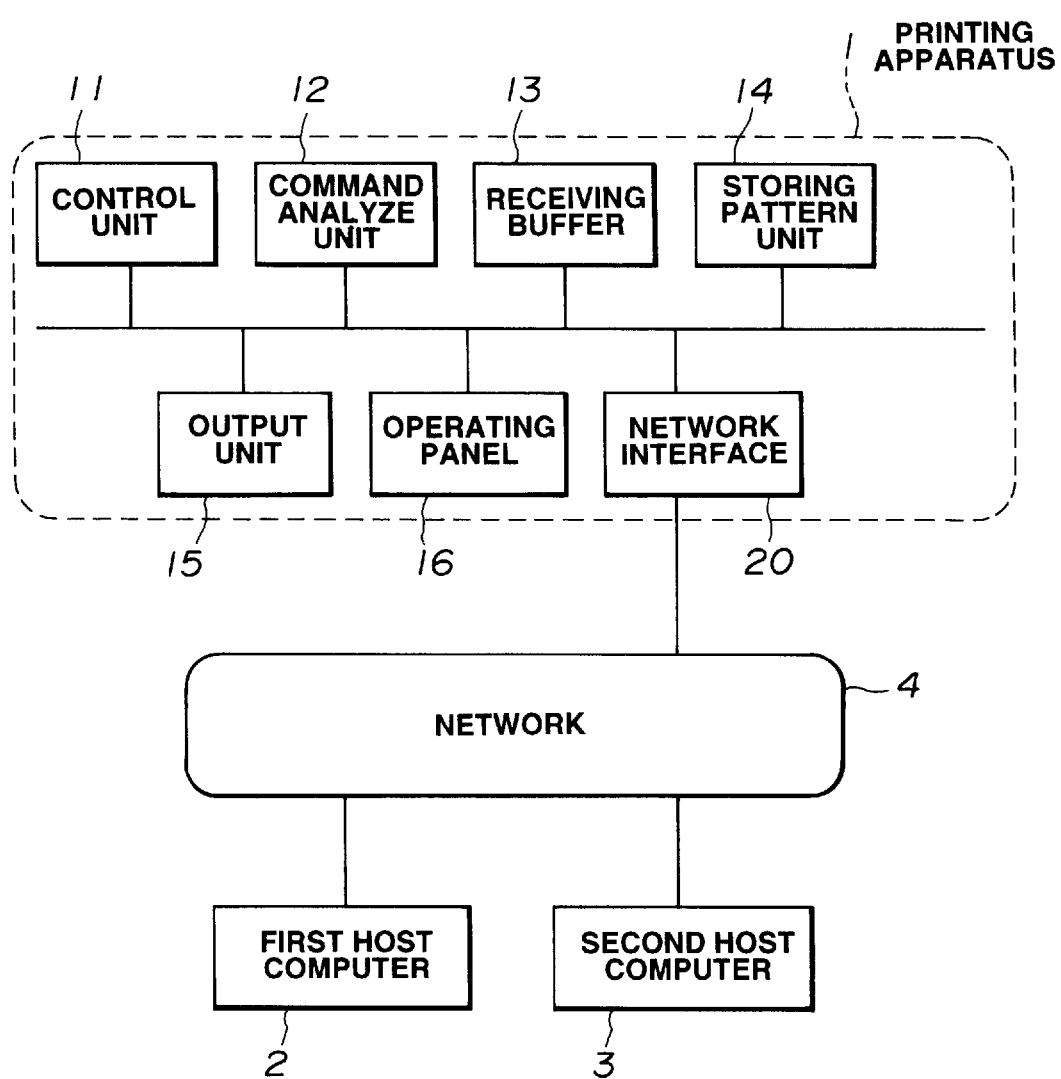
FIG. 5 is a block diagram showing control circuitry according to a fourth embodiment of the present invention.

FIG. 5 is a block diagram showing the construction of control circuitry according to a fourth embodiment of the present embodiment. Elements corresponding to those of FIG. 1 have the same reference numerals.

In FIG. 5, 4 is a network which is connected between a network interface 20 in the printing device 1 and the first and second host computers 2, 3. The network interface 20 includes a buffer which can temporarily store a protocol of the network 4 and data received from the network 4.

In the fourth embodiment, during the counting time by the control unit 11, the control unit 11 determines whether a specific amount of received data is output. Accordingly, the control unit 11 controls a continuation or an interruption of the process of outputting data in accordance with a flowchart of FIG. 6, discussed below.

When the control unit 11 controls the interruption of outputting data, the output unit 15 outputs the remaining data. When the output unit 15 has finished the control unit 11 determines whether a command to change interfaces is received and changes from the host computer being used to another interface in accordance with the flow chart shown in FIG. 6. Even if it is uncertain whether the printing device 1 can receive a stop command, the control unit 11 can begin receiving data from a host computer connected with the network 4. The receiving buffer 13 stores data from the network interface 20 until the command analyzing unit 12 can read the data.

Figure 6:
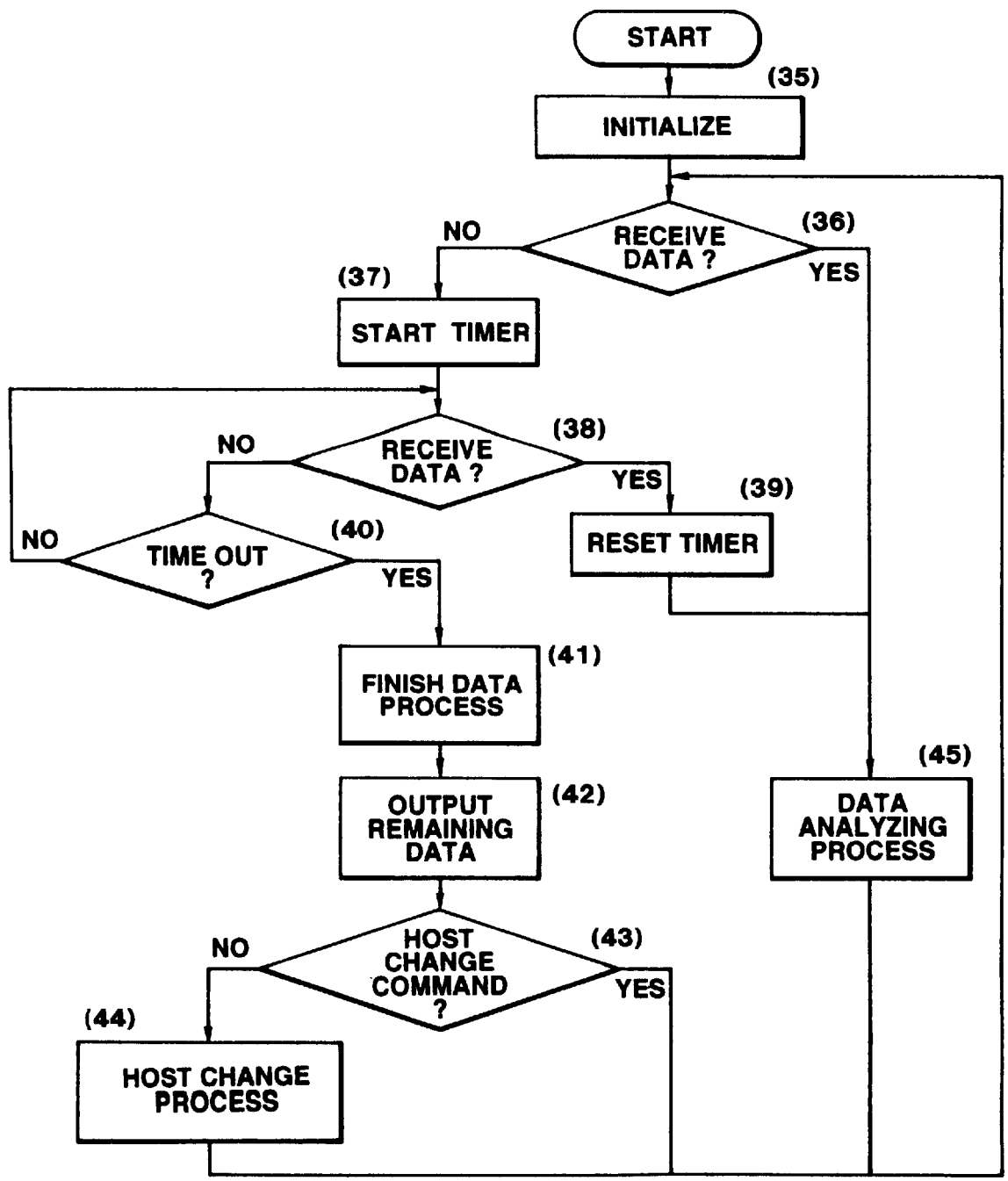
FIG. 6 is a flowchart showing an example of a print information processing procedure according to the fourth embodiment.

FIG. 6 is a flow chart showing an example of a print information processing procedure according to the fourth embodiment. A detailed description of the steps of data processing, converting data into bit map data and output processing are omitted. This embodiment uses a local area network (LAN).

In step (35) in FIG. 6, the control unit 11 sets the initial output environment information so that data from the first host computer 2 is received through the network interface 20 and transmitted to the receiving buffer 13.

In step (36), the command analyze unit 12 analyzes data, including commands, in the receiving buffer 13, and determines whether data is being received or not. If YES in step (36), the flow advances to step (45), wherein the command analyze unit 12 analyzes the data in receiving buffer 13. If there is a start command for processing data in the receiving buffer 13, the control unit 11 begins to process the data. If there is print data in the receiving buffer 13, the control unit 11 transmits it to the storing pattern unit 14, and the flow returns to step (36).

If NO in step (36), the flow advances to step (37). The control unit 11 begins to count the time during which no data is received. The flow then advances to step (38), wherein the control unit determines whether data is now being received. If YES in step (38), the control unit 11 stops counting in step (40). The flow advances to step (11) to analyze the data, and thereafter, the flow return to step (36).

If NO in step (38), the flow advances to step (40) wherein the control unit 11 determines whether a time-out signal has been produced or not. If NO in step (40), the flow returns to step (38).

If YES in step (40), the flow advances to step (41), wherein the control unit (11) finishes the processing of data. The flow then advances to step (42), wherein the control unit 11 outputs the remaining data if any exists. The flow then advances to step (43), wherein the control unit 11 determines whether the network interface 20, which includes a buffer, is to receive data from the second host computer 3. The control unit 11 recognizes this by detecting a host computer change command. The flow then advances to step (44), wherein the control unit 11 changes the output environment information so that the data in the buffer of the network interface 20 from the second host computer 2 received through the network 4 is transmitted to the receiving buffer 13. After that the flow returns to step (36). If NO in step (43), the flow directly returns to step (36).

In this embodiment, a LAN is used as a network which connects the printing apparatus 1 and the host computers 2, 3. However, other networks such as a packet-switching exchange system network or a digital communication network may be used.

As mentioned above, in the first embodiment, while no data is being received through the selected interface, the control unit 11 determines a prerequisite indicating the end of data processing in a memory and the condition of processing the data. The control unit 11 then controls the processing of data to be in either a waiting condition or an interruption condition.

When the interruption condition is set, the output unit outputs any remaining data. After finishing the output, the control unit determines whether there is an I/F change command, and changes from the current interface to another. Therefore, during data processing, the control unit 11 does not always stop processing the data even if more than a predetermined time elapses without receiving data, and the output unit can execute the output process appropriately.

Moreover, data from a host computer which is transmitting is outputted with certainty regardless of the data processing time.

As mentioned above, in the second embodiment, during the counting time by the control unit, the control unit determines whether it has received information concerning the next interruption of reception and thereby controls the timing of interruption to accommodate the host computer. The control unit can finish processing output data if no data is receiving from the host computer for longer than a predetermined period, even if a long time is necessary to process output data. The control unit can thereby recognize the precise time for an interruption for a host computer.

As mentioned above, in the third embodiment during the counting time by the control unit, the control unit determines whether there is additional output data in the receiving buffer and controls the continuation or interruption of the process of outputting data accordingly. When the control unit causes an interruption of outputting data, the output unit finishes outputting the data and the control unit determines whether a command to change interface has been received. If so, the control unit 11 changes from one interface to another.

Accordingly, even if it is uncertain whether the printing device can receive a stop command, the control unit can begin to receive data from a host computer connected to another interface.

Therefore, if no data is received for a predetermined period, the control unit can promptly begin to process and output data from another host computer because the control unit can recognize the precise time for an interruption of the job. Thereby a waiting time of the other host computer can be reduced.

As mentioned above, in the fourth embodiment, during the counting time by the control unit, the control unit determines whether there is additional data and controls the continuation or interruption of the process of outputting data. When the control unit causes an interruption of outputting data, the output unit outputs any remaining data. When the output unit finishes outputting, the control unit determines whether a command to change interfaces has been received. If so, the control unit changes from the host computer currently used for communication to another in the network.

Therefore if no data is received from a host computer in the network for a predetermined period, the control unit can promptly begin processing output data from another host computer in the network, and the waiting time of the other host computer can be reduced.

Furthermore, the features of all the above-described embodiments can be combined.

What is claimed is:

1. Output control apparatus comprising:
   a plurality of interfaces connected to respective ones of a plurality of host computers for each receiving data from the respective host computer;
   storing means for storing information indicating a prerequisite for finishing processing of data;
   first control means for controlling said apparatus to process data, said first control means controlling an interruption of processing of first data, received through one of said interfaces from the respective host computer of the one interface, in accordance with the prerequisite and switching to another one of said interfaces to permit second data to enter the other interface from the respective host computer of the other interface; and
   output control means for controlling output means to output remaining data of the first data after the interruption,
   wherein said first control means switches to the other interface for permitting the second data to enter after the output of the remaining data and causes said apparatus to thereafter process the second data.

2. Output control apparatus according to claim 1, further comprising counting means for counting a time during which no data is received, wherein said first control means controls the interruption in accordance with the time counted by said counting means.

3. Output control apparatus according to claim 2, further comprising reset means for resetting the time of said counting means when data is received by one of said interfaces.

4. output control apparatus according to claim 1, wherein said first control means determines whether a request for switching to the other interface is received during processing of the first data.

5. Output control apparatus according to claim 1, wherein said first control means controls said apparatus to keep processing the first data without interruption when the prerequisite indicates that no interruption should occur.

6. An output control method in an output control apparatus having a plurality of interfaces connected to respective ones of a plurality of host computers for each receiving data from the respective host computer, said method comprising:
   a storing step of storing information indicating a prerequisite for finishing processing of data;
   a first control step of controlling the apparatus to process data, said first control step controlling an interruption of processing of first data, received through one of the interfaces from the respective host computer of the one interface, in accordance with the prerequisite and switching to another one of the interfaces to permit second data to enter the other interface from the respective host computer of the other interface; and an output control step of controlling an output operation to output remaining data of the first data after the interruption, wherein said first control step switches to the other interface for permitting the second data to enter after the output of the remaining data and causes the apparatus to thereafter process the second data without interruption in accordance with the prerequisite.

7. A method according to claim 6, further comprising a counting step of counting a time during which no data is received, wherein said first control step controls the interruption in accordance with the time counted by said counting step.

8. A method according to claim 7, further comprising a reset step of resetting the time of said counting step when data is received by one of the interfaces.

9. A method according to claim 6, wherein said first control step determines whether a request for switching to the other interface is received during processing of the first data.

10. A method according to claim 6, wherein said first control step controls the apparatus to keep processing the first data without interruption when the prerequisite indicates that no interruption should occur.

* * * * *

UNITED STATES PATENT AND TRADEMARK OFFICE
CERTIFICATE OF CORRECTION

PATENT NO. : 5,889,930

DATED : March 30, 1999

INVENTOR(S) : NAOBUMI FUKUDOME

It is certified that error appears in the above-identified patent and that said Letters Patent is hereby corrected as shown below:

COLUMN 6

```
    Line 24, "((14)," should read --(14),--;
    Line 35, "advances (18)" should read
--advances to step (18)--; and
    Line 55, "(10)." should read --(23).--.
```

COLUMN 8

```
    Line 56, "step (11)" should read --step (45)--; and
    Line 64, "(11)" should read --11--.
```

UNITED STATES PATENT AND TRADEMARK OFFICE
CERTIFICATE OF CORRECTION

PATENT NO.    : 5,889,930

DATED         : March 30, 1999

INVENTOR(S) : NAOBUMI FUKUDOME

It is certified that error appears in the above-identified patent and that said Letters Patent is hereby corrected as shown below:

<u>COLUMN 10</u>

Line 45, "output" should read --Output--.

Signed and Sealed this

Seventh Day of March, 2000

Attest:

Q. TODD DICKINSON

*Attesting Officer*   *Commissioner of Patents and Trademarks*